March 11, 1969 F. G. HEWITT 3,432,820

TWO-CORE-PER-BIT MEMORY

Filed May 1, 1964 Sheet 1 of 5

INVENTOR.
FRED G. HEWITT
BY Thomas J. Nikolai
ATTORNEY

INVENTOR.
FRED G. HEWITT
BY
Thomas J Nikolai
ATTORNEY

March 11, 1969 F. G. HEWITT 3,432,820

TWO-CORE-PER-BIT MEMORY

Filed May 1, 1964 Sheet 3 of 5

INVENTOR.
FRED G. HEWITT
BY
Thomas J. Nikolai
ATTORNEY

INVENTOR.
FRED G. HEWITT
BY Thomas J. Nikolai
ATTORNEY

INVENTOR.
FRED G. HEWITT
BY Thomas J. Nikolai
ATTORNEY

United States Patent Office 3,432,820

Patented Mar. 11, 1969

3,432,820

TWO-CORE-PER-BIT MEMORY

Fred G. Hewitt, St. Paul, Minn., assignor to Sperry Rand Corporation, New York, N.Y., a corporation of Delaware Filed May 1, 1964, Ser. No. 364,142

U.S. Cl. 340—174 8 Claims

Int. Cl. G11b 5/00

ABSTRACT OF THE DISCLOSURE

Bit-organized and word-organized memory devices and systems including magnetizable cores that utilize the time-limited history effect to achieve binary storage at a single stable-state of magnetic induction.

This invention in its preferred embodiment utilizes memory elements of magnetizable material and in particular such elements that store binary data as a function of the prior partial or complete switching of the elements' magnetization. Accordingly, a discussion of such elements and some of their modes of operation is given below.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0."

Ordinary magnetizable cores and circuits utilized in destructive readout devices are now so well known that they need no special description herein; however, for purposes of the present invention, it should be understood that such magnetizable cores are capable of being magnetized to saturation in either of two directions. Furthermore, these cores are formed of magnetizable material selected to have a rectangular hysteresis characteristic which ensures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the switching threshold characteristic of a core having a substantially rectangular hysteresis characteristic. In this technique, a minimum of two interrogate lines thread the core's central aperture, each interrogate line setting up a magnetomotive force in the memory core of one-half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is considerably less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

PARTIAL SWITCHING

Amplitude-limited.—Condition wherein with a constant drive field amplitude, increase of the drive field duration will cause no appreciable increase in core flux density.

Time-limited.—Condition wherein with a constant drive field amplitude, increase of the drive field duration will cause appreciable increase in core flux density.

COMPLETE SWITCHING

Saturated.—Condition wherein increase of the drive field amplitude or duration will cause no appreciable increase in core flux density.

Stable-state.—Condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a minimum flux density of a positive or negative magnetic sense.

In my prior filed copending patent application filed July 23, 1962, Ser. No. 211,796, now Patent No. 3,331,064, there is disclosed a method of operating a magnetic memory element utilizing a single magnetic polarization state of remanent magnetization to achieve the storage of binary data. As taught therein the information state of the magnetic memory element, or core, is determined by the prior history of the applied drive field; not by the direction of the remanent magnetization. In both of the binary information states the remanent magnetization is in the same polarization state. However, due to the prior application of a time-limited write drive field—followed by an unconditional reset field of opposite polarity to the write field—the magnetic state of the core is affected such that a subsequent read drive field of the same direction as the write drive field switches the remanent magnetization of the core at an enhanced switching speed, producing an output signal in an output line coupled thereto which output signal has a faster rise time and greater peak amplitude than that produced by a comparable core that had not been subjected to the prior time-limited write drive field.

A typical embodiment of the present invention may be considered as involving the following methods of operation of a magnetizable core. For a starting, or initial, operating condition the remanent magnetization of the core is set into an initial saturated, or amplitude-limited, stable-state of say negative polarization. For the writing of a "1" the core is then subjected to a time-limited drive field setting the core into a time-limited stable-state of intermediate magnetization while for the writing of a "0" the core is allowed to remain at its initial stable-state. Following the write "1" operation the core is subjected to a negative saturating—or amplitude-limited—reset drive field after which the core is again at its initial stable-state. Readout is accomplished by subjecting the core to a positive saturating—or amplitude-limited—read drive field setting the remanent magnetization of the core into a saturated—or amplitude-limited—stable-state of positive polarization. After readout the core is again set into its initial stable-state. Due to the prior history of applying a time-limited write "1" drive field—although at readout both the stored "1" and stored "0" information states are represented by substantially the same magnetic stable-state—the flux change affected by the read field is distinguishably different from that of a core in which such time-limited write "1" drive field was not applied. The difference is due to the enhanced switching speed of a prior stored "1" core whereby a sharper output signal rise time-fall time characteristic and greater output signal peak amplitude is obtained. This difference, if detected, is an indication of the stored "1" condition.

The terms "signal," "pulse," etc., when used herein shall be used interchangeably to refer to the current signal that produces the corresponding magnetic field and to the magnetic field that is produced by the corresponding current signal.

The present invention is concerned with the application of the time-limited history effect of my above discussed copending patent application to memory systems comprising a matrix array of magnetizable memory elements arranged in rows and columns. A first preferred embodiment utilizes such effect to produce a novel word-organized memory system while a second preferred embodiment utilizes such effect to produce a novel coincident-current (bit-organized) memory system.

Accordingly, a primary object of this invention is to provide a novel method of operating a memory system.

Another object of this invention is to provide a novel word-organized memory system utilizing the time-limited history effect.

Another object of this invention is to provide a novel bit-organized memory system utilizing the time-limited history effect.

Another object of this invention is to provide a novel memory system that stores binary data at the substantially same remanent magnetization state but which data is determined by the prior magnetic history.

A further object of this invention is to provide a novel memory system that distinguishes the stored data as a function of the relative switching speed of the remanent magnetization.

These and other more detailed and specific objects will be disclosed in the course of the following specification, reference being had to the accompanying drawings, in which.

Figures 1, 2, 3, 4:
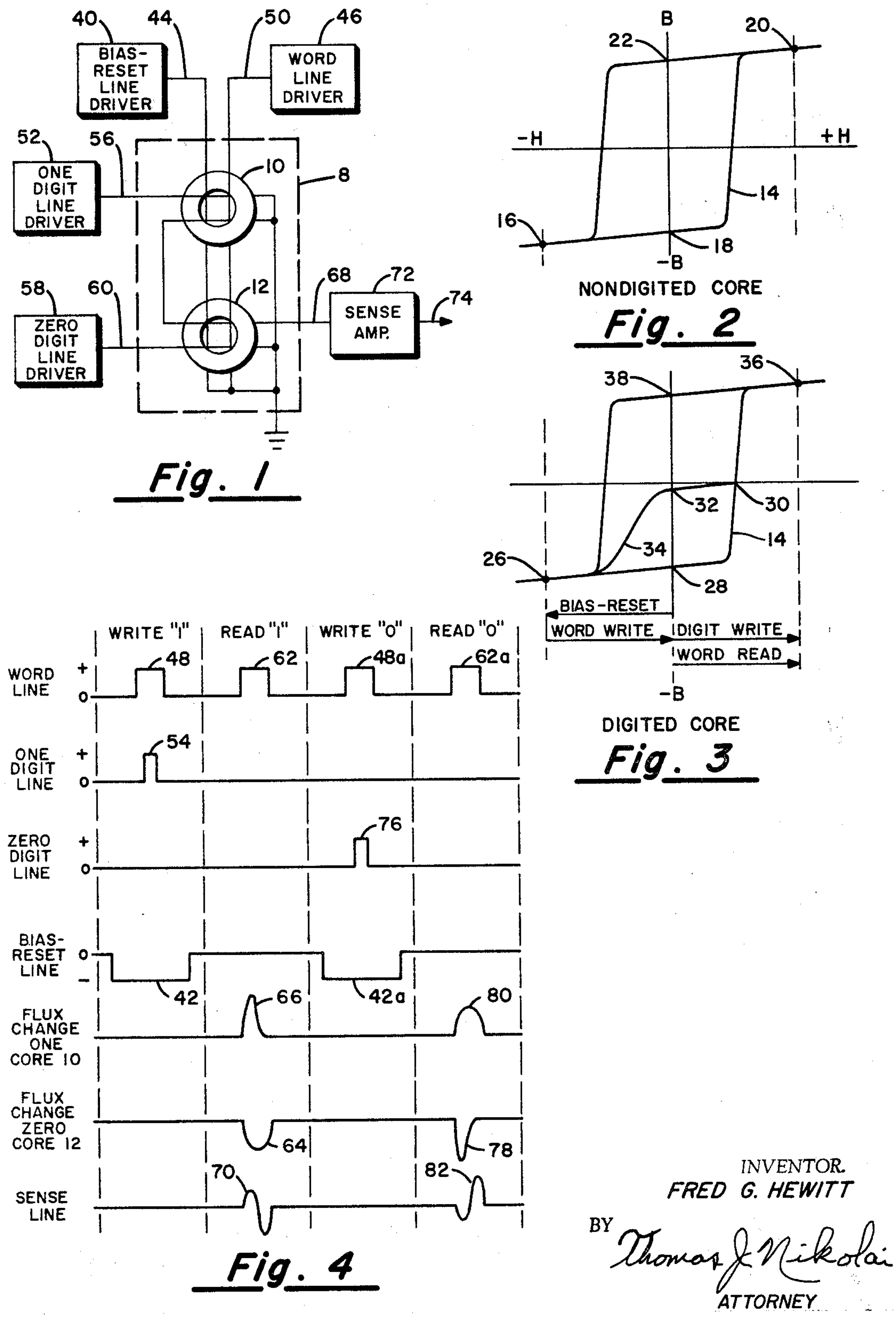
FIG. 1 is an illustration of a first preferred embodiment of a memory device utilizing the principles of the present invention.
FIG. 2 is an illustration of the typical hysteresis characteristic of the cores of FIG. 1.
FIG. 3 is an illustration of the typical hysteresis characteristic of the cores of FIG. 1 including the time-limited history effect of the present invention.
FIG. 4 is an illustration of typical control signals utilized with the embodiment of FIG. 1.

With particular reference to FIG. 1 there is disclosed a preferred embodiment of a memory device 8 utilizing the principles of the present invention. Cores 10 and 12 are typical toroidal ferrite cores having a substantially rectangular hysteresis characteristic having two stable-states of remanent magnetic polarization typically defined as the "1" and the "0" states. Reference to FIG. 2 discloses the typical hysteresis characteristic major loop 14 of such a core when subjected to saturating drive fields. In conventional operation, the core is subjected to a negative saturating write "0" drive field which drives the core's magnetic state along the major loop 14 to point 16 which upon cessation permits the core's magnetization to assume a polarization, or "0" remanent magnetic state, designated by point 18. If a "1" is to be written into the core it is subjected to a positive saturating write "1" drive field which drives the core's magnetic state along the major loop 14 to point 20 which field upon cessation permits the core's magnetization to assume a polarization, or "1" remanent magnetic state, designated by point 22. Readout is accomplished by subjecting the core to a negative saturating read drive field—of the same magnetic sense as the write "0" drive field—with the magnitude of the flux change induced in a sense line coupled thereto indicative of the prior remanent magnetic state. As an example, if in a prior "1" remanent magnetic state—stored "1"—the core's magnetic state upon readout traverses the major loop 14 along points 22–16–18, whereas if in a prior "0" remanent magnetic state—stored "0"—the core's magnetic state upon readout traverses the major loop 14 along points 18–16–18.

In contrast to the above conventional method of operation of a core as a memory element the present invention, as more fully disclosed in my aforementioned copending application, utilizes a method of operation whereas both a stored "1" and a stored "0" are represented by substantially the same remanent magnetic stable-state. With particular reference to FIG. 3 there is disclosed the typical hysteresis characteristic major loop 14 of FIG. 2. However, in the operation of the cores 10 and 12 of FIG. 1 by the method of the present invention there is considerable difference from that method discussed with regard to FIG. 2. In a preferred method of operation of the present invention the core is subjected to a negative saturating write "0" drive field which drives the core's magnetic state along the major loop 14 to point 26 which upon cessation permits the core's magnetization to assume a polarization, or "0" remanent magnetic state, designated by point 28. This may be considered to be an initial stable-state and is as in the aforementioned conventional manner. However, now if the core is to be placed in a stored "1" magnetic state the core is subjected to a positive time-limited write "1" drive field which drives the core's magnetic state along the major loop 14 to point 30 which drive field upon cessation permits the core's magnetization to assume an intermediate magnetic stable-state designated by point 32. This is then followed by a negative saturating "reset" drive field which drives the core's magnetic state along the minor loop 34 to point 26 on the major loop 14 which drive field upon cessation permits the core's magnetization to assume a polarization, or "1" remanent magnetic stable-state, designated by point 28. Thus, both binary states, a stored "1" and a stored "0," are represented by the same remanent magnetic stable-state designated by point 28.

Readout of the stored data is destructive with the stored data distinguished by the fact that a stored "1" upon readout provides an output that has a faster rise time and greater peak amplitude than that for a stored "0." To best illustrate applicant's preferred embodiment the signal waveforms of FIG. 4 are presented. As the distinguishing characteristic of a stored "1" and a stored "0" is the differences in output signal rise time and peak amplitude, applicant's preferred embodiment of FIG. 1 utilizes a two-core-per-bit memory device 8 including cores 10 and 12 having a single sense line magnetically coupled to both cores in an opposite magnetic polarization, or directive, sense. This arrangement provides an output signal which is the difference-signal due to the simultaneous interrogation of both cores; with the stored data determined by the phase-polarity of the difference-signal. As readout is destructive of the stored data each read cycle is followed by a re-write cycle if the read out data is to be maintained in memory device 8.

In the operation of memory device 8 of FIG. 1 for the writing of a "1" bias-reset line driver 40 couples bias-reset pulse 42—which is of a negative saturating amplitude-duration characteristic—to cores 10 and 12 by way of bias-reset line 44. This drives the magnetic state of core 10 to point 26 of FIG. 3 and the magnetic state of core 12 to point 16 of FIG. 2. Next, word line driver 46 couples word line write pulse 48—which is of a positive saturating amplitude-duration characteristic—to both cores 10 and 12 by way of word line 50. Next, coincident with the application of word line write pulse 48 and bias-reset pulse 42 and assuming that a "1" is to be written into memory device 8, ONE digit line driver 52 couples digit line pulse 54—which is of a positive time-limited amplitude-duration characteristic—to core 10 by way of ONE digit line 56; core 10 is termed the ONE core as it is the core that is subjected to the time-limited digit pulse, i.e., is the core that is "digited," for the writing of a "1." ZERO digit driver 58 couples no digit line pulse to core 12 by way of ZERO digit line 60 as it is digited only for the writing of a "0."

The effect of the coincident application of word write pulse 48 and bias-reset pulse 42 to core 12 is to cause the magnetic state of core 12 to move along the path described by points 18–16–18 of FIG. 2. However, the effect of the coincident application of word write pulse 48, bias-reset pulse 42 and ONE digit line pulse 54 to core 10 is to cause the magnetic state of core 10 to move along the path described by points 28–26–28–30–32–26–28 of FIG. 3. Upon readout, word line driver 46 couples word line read pulse 62—which is of a positive saturating amplitude-duration characteristic—to both cores 10 and 12 by way of word line 50. Pulse 62 drives the magnetic state of core 10 along the major loop 14 described by points 28–30–36–38 of FIG. 3 while the magnetic state of core 12 is driven along the major loop 14 described by points 18–20–22 of FIG. 2 generating the respective signals 66 and 64 in sense line 68 coupling the difference-signal 70 to sense amplifier 72. Sense amplifier 72 recognizes the polarity-phase of signal 72 as indicative of a stored "1" producing a corresponding signal at line 74.

In the write "0" operation the bias-reset line driver 40 couples bias-reset pulses **42*a* to cores 10 and 12 by way of bias-reset line 44. This drives the magnetic state of core 10 to point 16 of FIG. 2 and the magnetic state of core 12 to point 26 of FIG. 3. Next, word line driver 46 couples word line write pulse 48*a* to both cores 10 and 12 by way of word line 50 driving the magnetic state of core 10 to point 18 of FIG. 2 and the magnetic state of core 12 to point 28 of FIG. 3. Next, coincident with the application of word line write pulse 48*a* and bias-reset pulse 42*a* and assuming that a "0" is to be written into memory device 8, ZERO digit line driver 58 couples digit line pulse 76 to core 12 by way of ZERO digit line 60; core 12 is termed the ZERO core as it is the core that is digited for the writing of a "0." ONE digit line driver 52 couples no digit line pulse to core 10 by way of ONE digit line 56** as it is digited only for the writing of a "1."

The effect of the coincident application of word line write pulse **48*a* and bias-reset pulse 42*a* to core 10 is to cause the magnetic state of core 10 to move along the path described by points 18–16–18 of FIG. 2. However, the effect of the coincident application of word line write pulse 48*a*, bias-reset pulse 42*a* and ZERO digit line pulse 76 to core 12 is to cause the magnetic state of core 12 to move along the path described by points 28–26–28–30–32–26–28 of FIG. 3. Upon readout, word line driver 46 couples word line read pulse 62*a* to both cores 10 and 12 by way of word line 50. Pulse 62*a* drives the magnetic state of core 12 along the major loop 14 described by points 28–30–36–38 while the magnetic state of core 10 is driven along the major loop 14 described by points 18–20–22 generating the respective signals 78 and 80 in sense line 68 coupling the different-signal 82 to sense amplifier 72. Sense amplifier recognizes the polarity-phase of signal 82 as indicative of a stored "0" producing a corresponding signal at line 74**.

Figure 5:
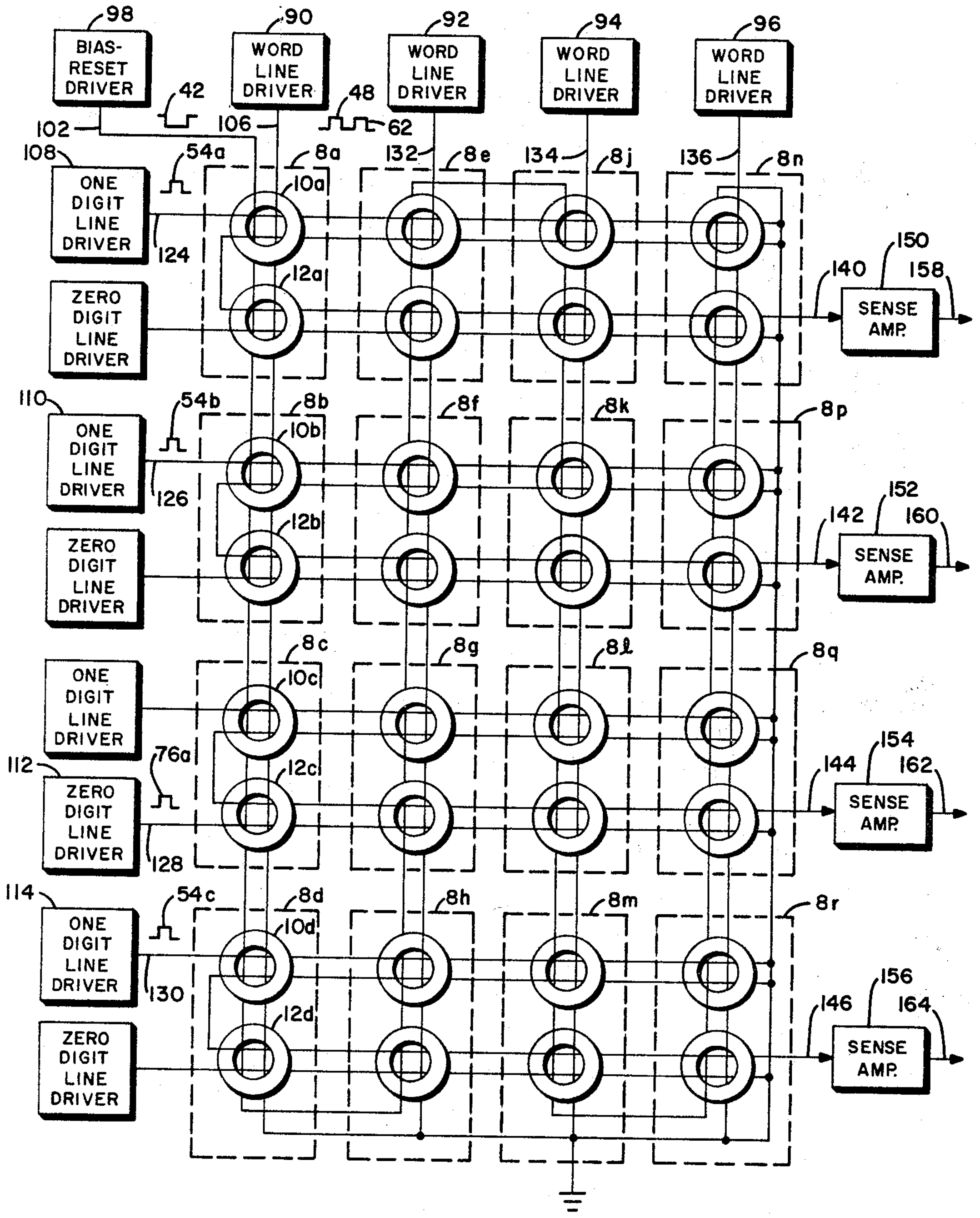
FIG. 5 is an illustration of a word-organized memory array utilizing the embodiment of FIG. 1 of the present invention.

With particular reference to FIG. 5 there is disclosed a word-organized memory comprising a matrix array of memory devices 8 arranged in four columns of four memory devices 8 per column. The multi-bit words of four-bits-per-word are arranged along the columns defined as the word lines with the respective bits arranged along the rows defined as the digit-lines. To best describe the operation of the word-organized memory of FIG. 5 assume that it is desired to write the binary word 1101 in the first or left-most word position defined by word line driver 90; the second, third, and fourth words are defined by the associated word lines of word line drivers 92, 94, and 96, respectively. As previously discussed, and with particular reference to FIG. 4, bias-reset driver 98 couples bias-reset pulse 42 to bias-reset line 102. This drives the magnetic states of all of the cores of memory devices 8*a*–8*r* to a point of negative saturation such as point 16 or 26 of FIG. 2 or 3, respectively. Next, word line driver 90 couples word line write pulse 48 to word line 106. This drives the magnetic states of the cores of the memory devices 8*a*–8*d* associated with word line 106 back toward their remanent magnetic states such as points 18 or 28 of FIGS. 2 or 3, respectively. NOTE: the magnetic states of the cores of the memory devices 8*e*–8*r*, not being affected by the word line write pulse 48, remain at their previously set points 16 or 26. Next, coincident with the application of word line write pulse 48 and bias-reset pulse 42, ONE digit line driver 108, ONE digit line driver 110, ZERO digit line driver 112 and ONE digit line driver 114 couple digit line drive pulses 54*a*, 54*b*, 76*a*, and 54*c*, respectively, to digit drive lines 124, 126, 128 and 130 respectively. Only those cores subjected to a coincident application of word line write pulse 48 and digit line drive pulses 54*a*, 54*b*, 76*a*, and 54*c* are subjected to a positive going drive field causing such cores to have their magnetic states driven along their major hysteresis loop 14 to a time-limited flux condition such as point 30 of FIG. 3, whereupon the cessation of word line drive pulse 48 and digit line drive pulses 54*a*, 54*b*, 76*a*, and 54*c* their magnetic states are driven along the minor hysteresis loop 34 of FIG. 3 to point 26 by the still existing action of the bias-reset pulse 42. Upon the cessation of bias-reset pulse 42 the magnetic states of such cores, and further including all cores of memory devices 8*a*–8*r*, are permitted to return to their negative remanent magnetic states such as point 18 or 28 of FIG. 2 or 3.

All cores of memory devices 8*a*–8*r* not subjected to the coincident application of word write line pulse 48 and digit line drive pulses 54*a*, 54*b*, 76*a*, or 54*c* have their magnetic states driven into a negative going magnetic sense by the action of the bias-reset pulse 42. Consequently, in no cases are these latter enumerated cores subjected to a positive going magnetic field of sufficient intensity to alter the information stored in the cores of the memory devices of word line 132, 134, or 136 and cores 12*a*, 12*b*, 10*c*, and 12*d* of the respective memory devices of word line 106.

As in the previous discussion of FIG. 1 the readout operation is initiated by the coupling of a read pulse to the appropriate word line. Assuming that the information previously stored in the multi-bit word defined by the memory devices associated with word line 106 is to be read out, word line driver 90 couples read pulse 62 to word line 106 driving the magnetic states of all cores associated therewith into their positive saturated state such as point 20 or 36 of FIG. 2 or 3. The resulting difference-signal due to the time-limited history effect of the above described writing operation induces in sense lines 140, 142, 144, and 146, output signals the polarity-phase of which defines the information stored in the multi-bit word associated with word line 106 to be 1101, which signals being coupled to sense amplifiers 150, 152, 154, and 156, respectively, provide the appropriate output signals on their associated output lines 158, 160, 162, and 164.

Figure 6:
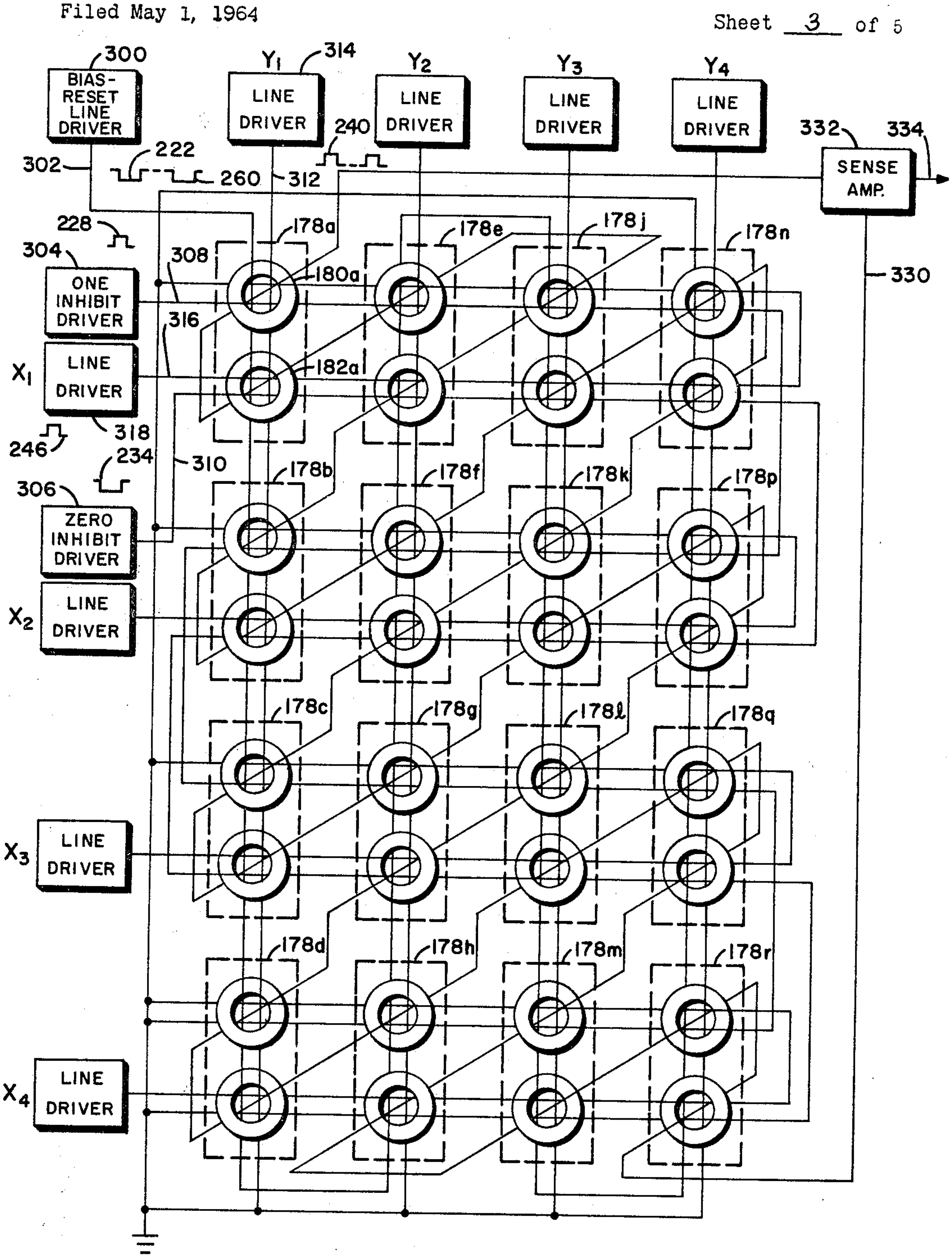
FIG. 6 is an illustration of a bit-organized memory array utilizing the embodiment of FIG. 7 of the present invention.

With particular references to FIG. 6 there is disclosed a bit-organized memory system comprising a matrix array of memory devices 178. The devices 178 are arranged in four columns and four rows with a device 178 at each intersection thereof: for purposes of simplifying the discussion of FIG. 6, the columns shall be defined as the Y lines and the rows shall be defined as the X lines. In contrast to the word-organized memory array of FIG. 5 in which all the bits of the multi-bit word lie along one planar word line, such as word line 106, each device 178 of the planar array of FIG. 6 is a corresponding ordered bit of a different multi-bit word; the illustrated array comprising 16 (XY) one-bit words. In the fabrication of a multi-bit bit-organized word memory array, for example, 16 words each of four-bits-per-word, there would be required four memory planes similar to that illustrated in FIG. 6. Each corresponding X line-Y line intersection in each plane defines the address of a different ordered bit of the same multi-bit word. As an example, at the $X_1Y_1$ drive line intersection in the upper left-hand corner of the array of FIG. 6 there is defined the highest ordered bit of a first word, in the $X_1Y_2$ drive line intersection there is defined the highest ordered bit of a second word, etc. At the corresponding X–Y intersections of the second, third and fourth planes of the assumed four plane memory—each plane having a separate bit for each word, there being as many bits per word as there are planes—are the second, third and fourth highest ordered bits of the word stored at the X–Y memory address. Consequently, to read out of this assumed four bit word, there would be required the coincident driving of the corresponding X line and the Y line of each of the four planes. The resultant output signal of each plane would be detected by the single-plane associated sense amplifier. However, due to the addressing, i.e., selection, requirements of such a three-dimensional array the control signal relationships are much more complicated than those of FIG. 4. Accordingly, FIGS. 7, 8, 9 and 10 are separately presented and discussed below.

Figure 7:
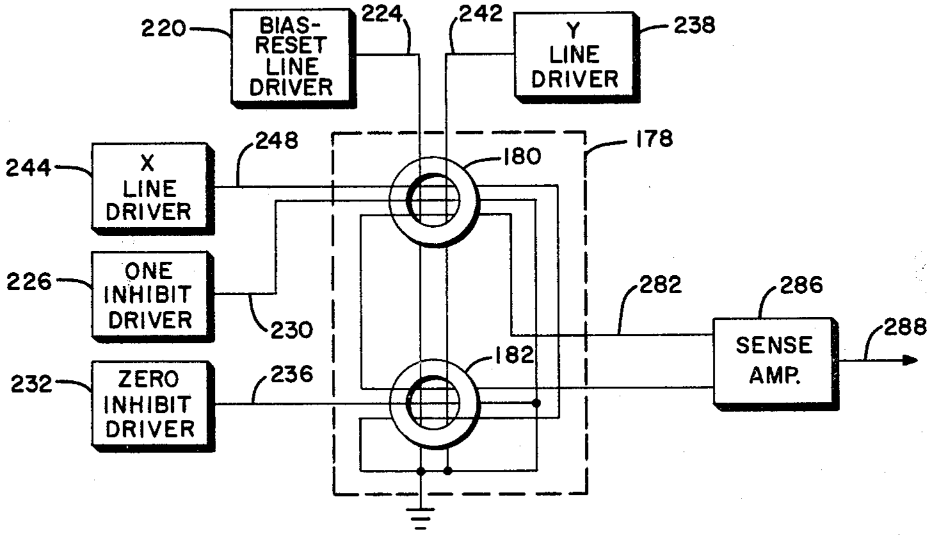
FIG. 7 is an illustration of a second preferred embodiment of a memory device utilizing the principles of the present invention.
Figure 8:
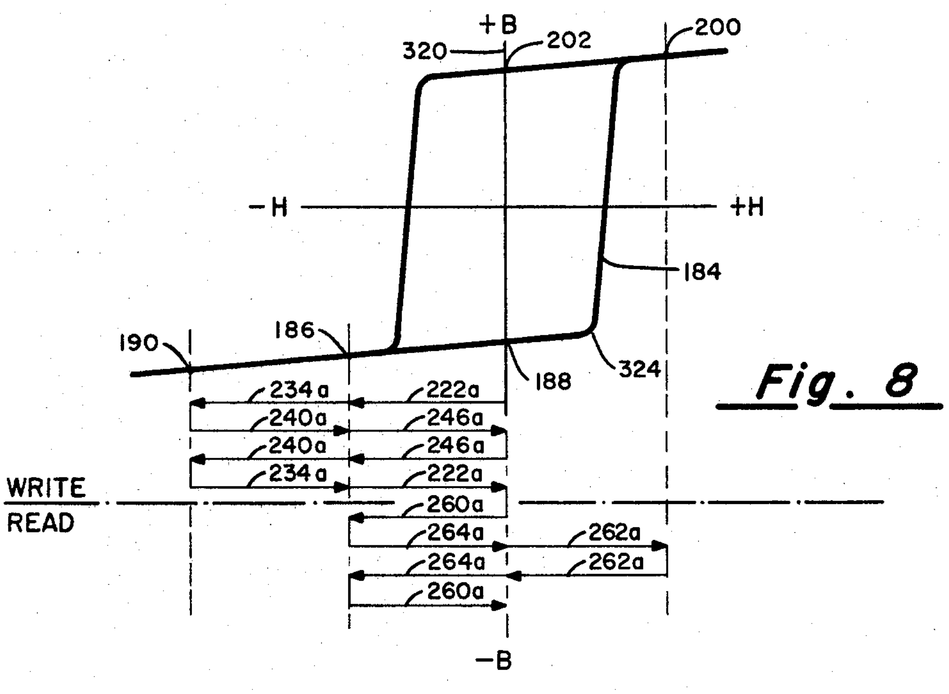
FIG. 8 is an illustration of the typical hysteresis characteristic of the cores of FIG. 7.

With particular reference to FIG. 7 there is disclosed a preferred embodiment of a memory device 178 utilizing the principles of the present invention and particularly adapted to the bit-organized memory array of FIG. 6. Cores 180 and 182 are typical toroidal ferrite cores having a substantially rectangular hysteresis characteristic having two stable states of remanent magnetic polarization typically defined as the "1" and the "0" states. Reference to FIG. 8 discloses the typical hysteresis characteristic major loop 184 of such a core when subjected to saturating drive fields. In conventional operation, the core is subjected to a negative saturating write "0" drive field which drives the core's magnetic state along the major loop 184 to point 186 which upon cessation permits the core's magnetization to assume a polarization, or "0" remanent magnetic state, designated by point 188. If a "1" is to be written into the core it is subjected to a positive saturating write "1" drive field which drives the core's magnetic state along the major hysteresis loop 184 to point 200 which field upon cessation permits the core's magnetization to assume a polarization, or "1" remanent magnetic state, designated by point 202. Readout is accomplished by subjecting the core to a negative saturating read drive field—of the same magnetic sense as the write "0" drive field—with the magnitude of the flux change induced in a sense line coupled thereto indicative of the prior remanent magnetic state. As an example, if in a prior "1" remanent magnetic state —stored "1"—the core's magnetic state upon readout traverse the major loop 184 along points 202–186–188, whereas if in a prior "0" remanent magnetic state—stored "0"—the core's magnetic state upon readout traverses the major loop 14 along points 188–186–188.

Figure 9:
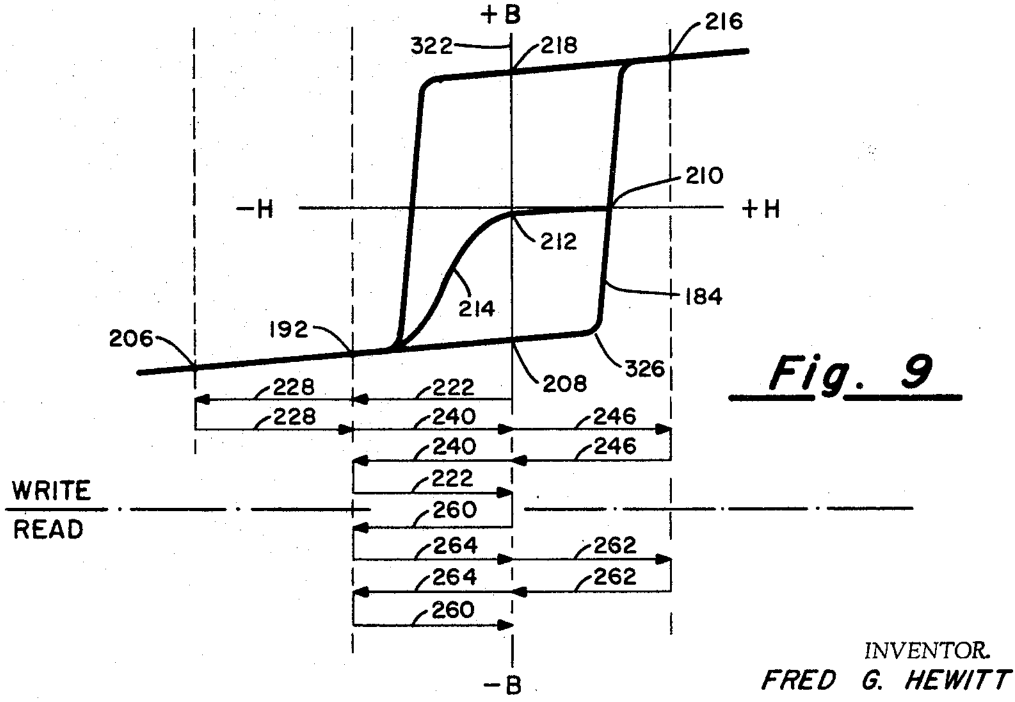
FIG. 9 is an illustration of the typical hysteresis characteristic of the cores of FIG. 7 including the time-limited history effect of the present invention.

In contrast to the above conventional method of operation of a core as a memory element a preferred embodiment of the present invention utilizes a method of operation where as both a stored "1" and a stored "0" are represented by substantially the same remanent magnetic stable-state. With particular reference to FIG. 9 there is disclosed the typical hysteresis characteristic major loop 184 of FIG. 8. However, in operation of the cores 180 and 182 of FIG. 7 by the method of the present invention there is considerable difference from that method discussed with regard to FIG. 6. In a preferred method of operation of the present invention the core is subjected to coincident fields providing a negative saturating write "0" drive field which drives the core's magnetic state along the major loop 184 to point 206 which upon cessation permits the core's magnetization to assume a polarization, or "0" remanent magnetic state, designated by pont 208. This is as in the conventional bit-organized manner. However, now if the core is to be placed in a stored "1" magnetic state the core is subjected to a net positive time-limited write "1" drive field which drives the core's magnetic state along the major loop 184 to point 210 which drive field upon cessation permits the core's magnetization to assume an intermediate magnetic stable-state designated by point 212. This is then followed by a negative saturating "reset" drive field which drives the core's magnetic state along the minor loop 214 to point 206 on the major loop 184, which drive field upon cessation permits the core's magnetization to assume a polarization, or "1" remanent magnetic stable-state, designated by point 208. Thus, both binary states, a stored "1" and a stored "0," are represented by the same remanent magnetic stable state-designated by point 208.

Figure 10:
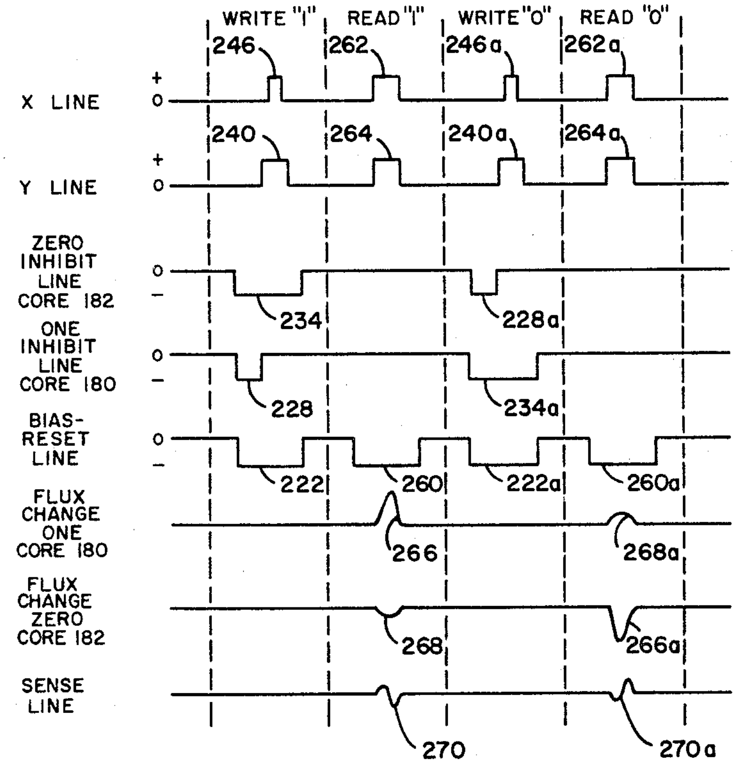
FIG. 10 is an illustration of typical control signals utilized with the embodiment of FIG. 7.

Readout of the stored data is destructive with the stored data distinguished by the fact that a stored "1" upon readout provide an output that has a faster rise time and greater peak amplitude than that for a stored "0." To best illustrate applicant's preferred embodiment the signal waveforms of FIG. 10 are presented. As the distinguishing characteristics of a stored "1" and a stored "0" are the differences in output signal rise time and peak amplitude, applicant's preferred embodiment of FIG. 6 utilizes a two-core-per-bit memory device 178 including cores 180 and 182 having a single sense line magnetically coupled to both cores in an opposite magnetic directed sense. This arrangement provides an output signal which is a difference-signal due to the simultaneous interrogation of both cores; with the stored data determined by the phase-polarity of the difference-signal. As readout is destructive of the stored data, each read cycle is followed by a re-write cycle if the read out data is to be maintained in memory device 178.

In the operation of memory device 178 of FIG. 7 for the writing of a "1" bias-reset line driver 220 couples bias-reset pulse 222—which is of a negative saturating amplitude-duration characteristic—to cores 180 and 182 by way of bias-reset line 224. Concurrently, ONE inhibit line driver 226 couples the relatively short duration ONE inhibit drive pulse 228 to ONE core 180 by way of ONE inhibit drive line 230 and ZERO inhibit line driver 232 couples the relatively long duraton ZERO inhibit line pulse 234 to ZERO core 182 by way of ZERO inhibit drive line 236. This drives the magnetic state of core 180 to point 206 of FIG. 9 and the magnetic state of core 182 to point 190 of FIG. 8. Next, after the cessation of ONE inhibit drive pulse 228 allowing the magnetic state of core 180 to fall back to point 192 of FIG. 9 Y-line driver 238 couples Y-line drive pulse 240 to cores 180 and 182 by way of Y-drive line 242. This drives the magnetic state of core 180 from point 192 to point 208 and the magnetic state of core 182 from point 190 to point 186. Next, X-line driver 244 couples X-drive pulse 246—which is a time-limited amplitude duration characteristic—to cores 180 and 182 by way of X-drive line 248. This causes the magnetic state of core 182 to move to point 188 of FIG. 8 and the magnetic state of core 180 to move along the major hysteresis loop 184 of FIG. 9 to point 210. Upon the subsequent cessation of drive pulses 246, 240, 234, and 222 the magnetic state of core 182 moves along the major hysteresis loop 184 of FIG. 8 passing through the successive points 188–186–190–186–188 coming to rest at the substantially saturated negative remanent magnetic stable-state of point 188. Correspondingly, upon the cessation of pulses 246, 240 and 222 the magnetic state of core 180 traverses the minor hysteresis loop 214 and the major hysteresis loop 184 of FIG. 9 by passing through the successive magnetic states of points 210–212–192–208. Accordingly, after cessation of the write "1" operation the magnetic state of core 180, it having been placed into the "1" magnetic stable-state resides at the substantially saturated remanent magnetic stable-state 208 which is similar to the terminal magnetic stable-state of point 188 of core 182 of FIG. 8. Accordingly, cores 180 and 182 have been placed into the binary informational states "1" and "0," respectively, by the application of the write drive fields of FIG. 10 is described above.

Readout of the information stored in the memory device 178 is initiated by bias-reset driver 220 coupling bias-reset pulse 260 to cores 180 and 182 by way of bias reset line 224. This moves the magnetic states of cores 180 and 182 to points 192 and 186 of FIGS. 9 and 8, respectively. Next, X-line driver 244 and Y-line driver 238 concurrently couple read signals 262 and 264, to cores 180 and 182 by way of drive lines 242 and 248. This causes the magnetic states of cores 180 and 182 to move into substantial positive saturation. The magnetic state of core 182 moves along the major loop 184 of FIG. 8 through points 186–188–200 coming to rest at the substantially positive saturated stable-state 202. The magnetic state of core 180 moves along the major hysteresis loop 184 of FIG. 9 through points 192–208–210–216 coming to rest at the substantially positive saturated stable-state 218. The variation of the flux in cores 180 and 182 due to the above readout operation induces corresponding flux changes generating output signals 266 and 268, respectively, producing the difference signal 270 in sense line 282 which is coupled to differential sense amplifier 286. Differential sense amplifier 286 recognizes this positive phase-polarity signal as a stored "1" condition producing a corresponding signal on its output line 288.

For the writing of a "0" in device 178, the above described operation is similar. Inspection of FIG. 10 indicates that for the writing of a "1" in device 178, ONE inhibit line driver 226 couples the relatively short duration signal 228 to core 180 while ZERO inhibit line driver 232 couples the relatively long duration signal 234 to core 182. For the writing of a "0" this procedure is reversed with ZERO inhibit line driver 232 coupling a relatively short duration signal 228*a* to ZERO core 182 and ONE inhibit driver 226 coupling a relatively long duration signal 234*a* to ONE core 180. In this regard, the mode of operation of the embodiment of the FIG. 7 is quite similar to that of FIG. 1. This similarity is that in the embodiment of FIG. 7 that core, the ONE core 180 or ZERO core 182, that is to be digited, i.e., in FIG. 7 the core that is effected by the shorter duration negative inhibit drive signal, such as signal 228 as compared to the longer duration negative inhibit drive signal such as signal 234, is the core that is said to be "digited" or placed into the "1" (see FIG. 9) state which upon readout determines the polarity-phase of the output signal. As an example, if ONE core 180 is digited, device 178 is set into the "1" state (see FIG. 9) which upon readout induces flux changes 266 and 268 in cores 180 and 182, respectively, providing positive polarity-phase signal 270 in sense line 282, while if ZERO core 182 is digited, the device 178 is set into the "0" state (see FIG. 8) which upon readout induces flux changes 268*a* and 266*a* in cores 180 and 182, respectively, providing negative polarity phase-signal 270*a* in sense line 282.

Now that the operation of memory device 178 has been explained as a bit storing elment of a bit-organized memory system, the preferred method of operation of the embodiment of FIG. 6 may be discussed. Remembering that each device 178 of the bit-organized memory array of FIG. 6 represents a corresponding ordered bit of a different word it is to be appreciated that the write-in and the readout processess involve effecting a substantial change in the magnetic state of only one device 178 of the four by four planar array of FIG. 6, To best describe the operation of the bit-organized memory of FIG. 6 assume that it is desired to write a "1" into device 178$a$ at the $X_1$–$Y_1$ line intersection—or the $X_1Y_1$ address. As previously discussed and with particular reference to FIG. 10 bias-reset line driver 300 couples bias-reset pulse 222 to bias-reset line 302. This drives the magnetic states of all of the cores of memory devices 178$a$–178$r$ to a point of negative saturation such as point 186 or 192 of FIG. 8 or 9, respectively. Next, coincident with the application of bias-reset pulse 222 to bias-reset line 302 ONE inhibit line driver 304 and ZERO inhibit line driver 306 couple pulses 228 and 234, respectively, to ONE inhibit drive line 308 and ZERO inhibit drive line 310, respectively. At this time all the cores 180 and 182 of all the memory devices 178$a$–178$r$ are set into the negative saturated state of points 190 or 206 of FIGS. 8 or 9. Next, for the writing of a "1," the ONE inhibit line driver "digits" all the associated ONE cores 180 of all the memory devices 178 of the planar array of FIG. 6, i.e., the negative polarized ONE inhibit signal 228 is terminated prior to that of the ZERO inhibit pulse 234, thus permitting the magnetic states of all the ONE cores 180 to return to the negative polarized substantially saturated stable-state 192 of FIG. 9. Correlatively, as the ZERO inhibit driver 306 yet couples ZERO inhibit pulse 234 to ZERO inhibit drive line 310 all associated ZERO cores 182 of the planar array of FIG. 6 are still held at the substantially saturated stable state 190 as in FIG. 8. Now, the coincident application of the $Y_1$ line drive pulse 240 to $Y_1$ drive line 312 by $Y_1$ line driver 314 and the coupling of the $X_1$ line drive pulse 246 to $X_1$ drive line 316 by $X_1$ line driver 318 drives the magnetic state of core 180 of device 178$a$ along its major hysteresis loop 184 from points 192–208 to point 210 which magnetic state upon the cessation of signals 240 and 246 returns along the minor hysteresis loop 214 to come to rest at the substantially negative saturated stable-state 192 of FIG. 9. Initially, as ZERO inhibit line driver 306 is still causing ZERO inhibit signal 234 to be coupled to core 182 of memory device 178$a$, the magnetic state of core 182 is precluded from moving into a positive polarized state, merely moving along the substantially negative saturated line of FIG. 8 passing through the points 190–186–188–186–190. Finally, ZERO inhibit drive pulse 234 and bias-reset pulse 222 terminate permitting the magnetic states of cores 180 and 182 to return to their substantially saturated negative stable-states 208 and 188, respectively. At this time the ONE core 180$a$ of memory device 178$a$ has been digited setting it into the "1" state as evidenced by its having passed through a previously set time-limited stable-state 212 of minor hysteresis loop 214 while ZERO core 182$a$ stores a "0" as evidenced by it having merely traversed the substantially horizontal portion of the major hysteresis loop 184 of FIG. 8. Additionally, all other ONE cores 180 and ZERO cores 182 of the memory devices 178$b$ through 178$r$ of the planar array of FIG. 6 have been subjected to drive fields of insufficient intensities to effect a positive polarized magnetic change in their magnetic states. In other words, the effects of the coupled negative polarized drive fields has held the magnetic states of these above noted cores into a negative polarized state precluding the passage of their magnetic states into a positive polarized state or moving to the right of the zero drive field axes 320 and 322 of FIGS. 8 and 9, respectively. Although in the preferred and illustrated embodiment the magnetic states of these cores do not, in fact, pass beyond the zero axis of the drive field as evidenced by the axes 320 and 322, it is not necessary that such magnetic state traversal be limited thereto. The only limitation to the movement of such magnetic states is that the magnetic states under the combinations of such drive fields in no case move beyond the switching thresholds of the major or minor hysteresis loops of FIG. 8 or 9. Thus, this limitation is such that under any drive field conditions the magnetic states of the non-digited cores 180 and 182 of memory devices 178$b$–178$r$ be not moved beyond the switching thresholds 324 and 326 of FIGS. 8 and 9, respectively.

For the readout of the information stored in device 178$a$ the method is as discussed with regard to FIG. 7. Initially, bias-reset line driver 300 couples bias-reset signal 260 to bias-reset line 302. This biases all the cores of the planar array of FIG. 6 into a substantially saturated negative state such as point 186 or 192 of FIG. 8 or 9. Next, $Y_1$ line driver 314 and $X_1$ line driver 318 couple their drive signals 264 and 262, respectively, to $Y_1$ drive line 312 and $X_1$ drive line 316, respectively. Thus, only those cores 180 and 182 of memory device 178$a$ receive the coincident $X_1Y_1$ drive pulses. The effects on the cores of the other memory devices, such as the cores of memory devices 178$b$, 178$c$, and 178$d$ which receive the single $Y_1$ drive signal and the cores of memory devices 178$e$, 178$j$ and 178$n$ which receive the single $X_1$ drive signal 262, are such that the net effect of such coincident signals is to merely move the magnetic states of such cores into a negaitve saturated state such as 186 or 192 and back into the substantially saturated negative remanent state of 188 or 208 of FIG. 8 or 9. The cores of the other memory devices—memory devices 178$f$, 178$g$, 178$h$, 178$k$, 178$l$, 178$m$, 178$p$, 178$q$, 178$r$—being uneffected by an X or a Y drive signal remain at their saturated negative state of 186 or 192 as established by bias-reset signal 260. The coincident effect of drive signals 262 and 264 upon cores 180$a$ and 182$a$ of memory device 178$a$ induces a flux change 266 in core 180 and a flux change 268 in core 182 inducing a difference-signal in sense line 330, both ends of which are coupled to differential sense amplifier 332. Differential sense amplifier 332 recognizes the positive polarity-phase difference-signal 270 as indicative of a "1" stored in the selected memory device 178$a$ producing a corresponding "1" signal output on its output line 334. As in the previous discussion of FIG. 7 it is apparent that if a "0" had been written into memory device 178$a$, the coincident application of $X_1$ drive signal 262$a$ and $Y_1$ drive line signal 264$a$ would have induced a flux change 268$a$ in core 180 and a flux change 266$a$ in core 182 inducing a negative polarity-phase difference-signal 270$a$ in sense line 330. In this case, differential sense amplifier 332 would have recognized this output signal as indicative of a stored "0" producing a corresponding signal upon its output line 334.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. In a magnetic memory device for use in a word-organized memory array wherein binary information is stored in a magnetic core in a single state of remanent magnetization and is distinguished by the core's prior magnetic history, the combination comprising:

two substantially similar magnetic cores termed the ONE core and the ZERO core, each having a substantially rectangular hysteresis characteristic defining first and second oppositely-polarized saturated stable-states and having a third intermediate time-limited stable-state;

bias drive means for selectively coupling to said cores a second polarity saturating bias drive field;

word drive means for selectively coupling to said cores a first polarity saturating word drive field;

ONE drive means for selectively coupling a first polarity time-limited ONE drive field to only said ONE core concurrent with the coupling of said word drive field and said bias drive field to said cores for driving the magnetization of only said ONE core into said third time-limited stable-state from said first saturated stable-state;

ZERO drive means for selectively coupling a first polarity time-limited ZERO drive field to only said ZERO core concurrent with the coupling of said word drive field and said bias drive field to said cores for driving the magnetization of only said ZERO core into said third time-limited stable-state from said first saturated stable-state;

said ONE core or said ZERO core mutually exclusively being set into said third time-limited stable-state;

reset drive means for selectively coupling to said cores a second polarity saturating reset drive field for driving the magnetization of said cores back into said second saturated stable-state from said third time-limited stable-state;

read means for selectively coupling to said cores a first polarity saturating read drive field for driving the magnetization of said cores into said first saturated stable-state from said second saturated stable-state;

sense means coupled to said cores for intercepting the flux changes due to said driving of the magnetization of said cores into said first saturated stable-state from said second saturated stable-state and for interpreting said flux changes as indicating whether the magnetization of said ONE core or said ZERO core had previously been set into said third time-limited stable-state.

2. In a magnetic memory device for use in a word-organized memory array wherein binary information is stored in a magnetic core in a single state of remanent magnetization and is distinguished by the core's prior magnetic history, the combination comprising:

two substantially similar magnetic cores termed the ONE core and the ZERO core each having a substantially rectangular hysteresis characteristic defining first and second oppositely-polarized amplitude-limited stable-states and having a third intermediate time-limited stable-state;

a second polarity amplitude-limited bias drive field;

word drive means for selectively coupling to said cores a first polarity amplitude-limited word drive field of substantially the same amplitude characteristic as is the bias drive field;

ONE drive means for selectively coupling a first polarity time-limited ONE drive field to only said ONE core concurrent with the coupling of said word drive field and said bias drive field to said cores for driving the magnetization of only said ONE core into said third time-limited stable-state from said second amplitude-limited stable-state;

ZERO drive means for selectively coupling a first polarity time-limited ZERO drive field to only said ZERO core concurrent with the coupling of said word drive field and said bias drive field to said cores for driving the magnetization of only said ZERO core into said third time-limited stable-state from said second amplitude-limited stable-state;

said ONE core or said ZERO core mutually exclusively being set into said third time-limited stable-state;

reset drive means for selectively coupling to said cores a second polarity amplitude-limited reset drive field for driving the magnetization of said cores back into said second amplitude-limited stable-state from said third time-limited stable-state;

read means for selectively coupling to said cores a first polarity amplitude-limited read drive field for driving the magnetization of said cores into said first amplitude-limited stable-state from said second amplitude-limited stable-state;

sense means coupled to said cores for intercepting the flux changes due to said driving of the magnetization of said cores into said first amplitude-limited stable-state from said second amplitude-limited stable-state and for interpreting said flux changes as indicating whether the magnetization of said ONE core or said ZERO core had previously been set into said third time-limited stable-state.

3. A word-organized memory array, comprising:

a plurality of magnetic memory devices wherein binary information is stored in a magnetic core in a single state of remanent magnetization and is distinguished by the core's prior magnetic histories;

said devices arranged in an array of rows and columns with a device at each row column intersection and all the devices of each column defining a separate word line and all the devices of each row defining a separate digit line, each digit line having like-ordered digits of each respective word-line;

each of said devices including two substantially similar magnetic cores termed the ONE core and the ZERO core, each core having a substantially rectangular hysteresis characteristic defining first and second oppositely-polarized saturated stable-states and having a third intermediate time-limited stable-state;

bias drive means for selectively coupling a second polarity saturating bias drive field to all the cores of said array;

word drive means for selectively coupling a first polarity saturating word drive field to all the cores of a separate selected word line;

ONE drive means for selectively coupling a first polarity time-limited ONE drive field to selected ONE cores of said selected word line concurrent with the coupling of said word drive field to all the cores of said selected word line and the coupling of said bias drive field to all the cores of the array for driving the magnetization of the concurrently affected ones of said ONE cores into said third time-limited stable-state from said second saturated stable-state;

ZERO drive means for selectively coupling a first polarity time-limited ZERO drive field to the selected ZERO cores of said selected word line concurrent with the coupling of said word drive field to all the cores of said selected word line and the coupling of said bias drive field to all the cores of the array for driving the magnetization of the concurrently affected ones of said ZERO cores into said third time-limited stable-state from said second saturated stable-state;

said ONE core or said ZERO core of each of said devices of said selected word line mutually exclusively being set into said third time-limited stable-state;

reset drive means for selectively coupling a second polarity saturating reset drive field to all the cores of said array for driving the magnetization of said cores back into said second saturated stable-state from said third time-limited stable-state;

read drive means for selectively coupling a first polarity saturating read drive field to all the cores of said selected word line for driving the magnetization of said cores into said first saturated stable-state from said second saturated stable-state;

separate sense means coupled to all the cores of each separate digit line for intercepting the flux changes due to said driving of the magnetization of said cores into said first saturated stable-state from said second saturated stable-state and for interpreting the flux changes as indicating whether the magnetization of said ONE core or of said ZERO core had previously been set into said time-limited stable-state.

4. A word-organized memory array, comprising:

a plurality of magnetic memory devices wherein binary information is stored in a magnetic core in a single state of remanent magnetization and is distinguished by the core's prior magnetic histories;

said devices arranged in an array of rows and columns with a device at each row column intersection and all the devices of each column defining a separate word line and all the devices of each row defining a separate digit line, each digit line having like-ordered digits of each respective word line;

each of said devices including two substantially similar magnetic cores termed the ONE core and the ZERO core, each core having a substantially rectangular hysteresis characteristic defining first and second oppositely-polarized time-limited stable states and having a third intermediate time-limited stable-state;

bias drive means for selectively coupling a second polarity amplitude-limited bias drive field to all the cores of said array;

word drive means for selectively coupling a first polarity amplitude-limited word drive field to all the cores of a separate selected word line;

ONE drive means for selectively coupling a first polarity time-limited ONE drive field to selected ONE cores of said selected word line concurrent with the coupling of said word drive field to all the cores of said selected word line and the coupling of said bias drive field to all the cores of the array for driving the magnetization of the concurrently affected ones of said ONE cores into said third time-limited stable-state from said second amplitude-limited stable-state;

ZERO drive means for selectively coupling a first polarity time-limited ZERO drive field to the selected ZERO cores of said selected word line concurrent with the coupling of said word drive field to all the cores of said selected word line and the coupling of said bias drive field to all the cores of the array for driving the magnetization of the concurrently affected ones of said ZERO cores into said third time-limited stable-state from said second amplitude limited stable-state;

said ONE core or said ZERO core of each of said devices of said selected word line mutually exclusively being set into said third time-limited stable-state;

reset drive means for selectively coupling a second polarity amplitude-limited reset drive field to all the cores of said array for driving the magnetization of said cores back into said second amplitude-limited stable-state from said third time-limited stable-state;

read drive means for selectively coupling a first polarity amplitude-limited drive field to all the cores of said selected word line for driving the magnetization of said cores into said first amplitude-limited stable-state from said second amplitude-limited stable-state;

separate sense means coupled to all the cores of each separate digit line for intercepting the flux changes due to said driving of the magnetization of said cores into said first amplitude-limited stable-state from said second amplitude-limited stable-state and for interpreting the flux changes as indicating whether the magnetization of said ONE core or of said ZERO core had previously been set into said third time-limited stable-state.

5. In a magnetic memory device for use in a bit-organized memory array wherein binary information is stored in a magnetic core in a single state of remanent magnetization and is distinguished by the core's prior magnetic history, the combination comprising:

two substantially similar magnetic cores termed the ONE core and the ZERO core, each core having a substantially rectangular hysteresis characteristic defining first and second oppositely-polarized saturated stable-states and having a third intermediate time-limited stable-state;

bias drive means for selectively coupling to said cores a second polarity saturating bias drive field;

X drive means for alternatively selectively coupling to said cores a first polarity time-limited X drive field or a first polarity saturating X drive field;

Y drive means for selectively coupling to said cores a first polarity saturating Y drive field;

the concurrent coupling of only said time-limited X drive field, said Y drive field and said bias drive field to their concurrently affected cores capable of driving the magnetization of such cores into said third time-limited stable-state;

ONE inhibit drive means for alternatively selectively coupling a second polarity first or second different-duration saturating ONE inhibit drive field to said ONE core, said second but not said first ONE inhibit drive field inhibiting the driving of the magnetization of said ONE core into said third time-limited stable-state when concurrently affected by said time-limited X drive field, said Y drive field and said bias drive field;

ZERO inhibit drive means for alternatively selectively coupling a second polarity first or second different-duration saturating ZERO inhibit drive field to said ZERO core, said second but not said first ZERO inhibit drive field inhibiting the driving of the magnetization of said ZERO core into said third time-limited stable-state when concurrently affected by said time-limited X drive field, said Y drive field and said bias drive field;

said ONE inhibit drive means and said ZERO inhibit drive means mutually exclusively coupling their associated longer duration inhibit drive fields to said ONE core and said ZERO core, respectively;

reset drive means for selectively coupling a second polarity saturating reset drive field said cores for driving the magnetization of said cores back into said second saturated stable-state from said third time-limited stable-state;

the concurrent coupling of said saturating X and Y drive fields and said reset drive field to said cores driving the magnetization of said cores into said first saturated stable-state from said second saturated stable-state;

sense means coupling to said cores for intercepting the flux changes due to said driving of the magnetization of said cores into said first saturated stable-state from said second saturated stable-state for interpreting said flux changes as indicated whether the magnetization of said ONE core or said ZERO had previously been set into said third time-limited stable-state.

6. In a magnetic memory device for use in a bit-organized memory array wherein binary information is stored in a magnetic core in a single state of remanent magnetization and is distinguished by the core's prior magnetic history, the combination comprising:

two substantially similar magnetic cores termed the ONE core and the ZERO core, each core having a substantially rectangular hysteresis characteristic defining first and second oppositely-polarized saturated stable-states and having a third intermediate time-limited stable-state;

bias drive means for selectively coupling to said cores a second polarity amplitude-limited bias drive field;

X drive means for alternatively selectively coupling to said cores a first polarity time-limited X drive field or a first polarity amplitude-limited X drive field to said core;

Y drive means for selectively coupling to said cores a first polarity amplitude-limited Y drive field;

the concurrent coupling of only said time-limited X drive field, said Y drive field and said bias drive field to their concurrently affected cores capable of driving the magnetization of such cores into said third time-limited stable-state;

ONE inhibit drive means for alternatively selectively coupling a second polarity first or second different-duration amplitude-limited ONE inhibit drive field to said ONE core, said second but not said first ONE inhibit drive field inhibiting the driving of the magnetization of said ONE core into said third time-limited stable-state when concurrently affected by said time-limited X drive field, said Y drive field and said bias drive field;

ZERO inhibit drive means for alternatively selectively coupling a second polarity first or second different-duration amplitude-limited ZERO inhibit drive filed to said ZERO core, said second but not said first ZERO inhibit drive field inhibiting the driving of the magnetization of said ZERO core into said third time-limited stable-state when concurrently affected by said time-limited X drive field, said Y drive field and said bias drive field;

said ONE inhibit drive means and said ZERO inhibit drive means mutually exclusively coupling their associated longer duration inhibit drive fields to said ONE core and said ZERO core, respectively;

reset drive means for selectively coupling to said cores a second polarity amplitude-limited reset drive field for driving the magnetization of said cores back into said second amplitude-limited stable-state from said third time-limited stable-state;

the concurrent coupling to said cores of said amplitude-limited X and Y drive fields and said reset drive field driving the magnetization of said cores into said first amplitude-limited stable-state from said second amplitude-limited stable-state;

sense means coupled to said cores for intercepting the flux changes due to said driving of the magnetization of said cores into said first amplitude-limited stable-state from said second amplitude-limited stable-state for interpreting said flux changes as indicating whether the magnetization of said ONE core of said ZERO core had previously been set into said third time-limited stable-state.

7. A bit-organized memory array, comprising:

a plurality of magnetic memory devices wherein binary information is stored in a magnetic core in a single state of remanent magnetization and is distinguished by the core's prior magnetic history;

said devices arranged in an array of rows and columns with a device at each row column intersection and all the devices of each column defining a separate Y-line and all the devices of each row defining a separate X-line;

each of said devices including two substantially similar magnetic cores termed the ONE core and the ZERO core, each core having a substantially rectangular hysteresis characteristic defining first and second oppositely-polarized saturated stable-states and having a third intermediate time-limited stable-state;

bias drive means for selectively coupling a second polarity saturating bias drive field to all the cores of said array;

X drive means for alternatively selectively coupling a first polarity time-limited or saturating X drive field to all the cores of a separate selected row;

Y drive means for selectively coupling a first polarity saturating Y drive field to all the cores of a separate selected column;

the concurrent coupling of only said time-limited X drive field, said Y drive field and said bias drive field to their concurrently affected respective cores capable of driving the magnetization of such cores into said third time-limited stable-state;

ONE inhibit drive means for alternatively selectively coupling a second polarity first or second different-duration saturating ONE inhibit drive field to all the ONE cores of said array, said second but not said first ONE inhibit drive field inhibiting the driving of the magnetization of a concurrently affected ONE core into said third time-limited stable-state;

ZERO inhibit drive means for alternatively selectively coupling a second polarity first or second different-duration saturating ZERO inhibit drive field to all the ZERO cores of said array said second but not said first ZERO inhibit drive field inhibiting the driving of the magnetization of a concurrently affected ZERO core into said third time-limited stable-state;

reset drive means for selectively coupling a second polarity saturating reset drive field to all the cores of said array for driving the magnetization of said cores back into said second saturated stable-state from said third time-limited stable-state;

the concurrent coupling of said saturating X and Y drive fields to all the cores of their selected row and column, respectively, and said reset drive field to all the cores of the array for driving the magnetization of the concurrently affected ONE core or said ZERO core into said first saturated stable-state from said second saturated stable-state;

sense means coupled to all the cores of said array for intercepting the flux changes due to said driving of the magnetization of said concurrently affected ONE core or ZERO core into said first saturated stable-state from said second saturated stable-state and for interpreting said flux changes as indicating whether the magnetization of said ONE core or said ZERO core had previously been set into said third time-limited stable-state.

8. A bit-organized memory array, comprising:

a plurality of magnetic memory devices wherein binary information is stored in a magnetic core in a single state of remanent magnetization and as distinguished by the core's prior magnetic history;

said devices arranged in an array of rows and columns with a device at each row column intersection and all the devices of each column defining a separate Y-line and all the devices of each row defining a separate X-line;

each of said devices including two substantially similar magnetic cores termed the ONE core and the ZERO core, each core having a substantially rectangular hysteresis characteristic defining first and second oppositely polarized amplitude-limited stable-states and having a third intermediate time-limited stable-state;

bias drive means for selectively coupling a second polarity amplitude-limited bias drive field to all the cores of said array;

X drive means for alternatively selectively coupling a first polarity time-limted or saturating X drive field to all the cores of a separate selected row;

Y drive means for selectively coupling a first polarity saturating Y drive field to all the cores of a separate selected column;

the concurrent coupling of only said time-limited X drive field, said Y drive field and said bias drive field to their concurrently affected respective cores capable of driving the magnetization of such cores into said third time-limited stable-state;

ONE inhibit drive means for alternatively selectively coupling a second polarity first or second different-duration amplitude-limited ONE inhibit drive field to all the ONE cores of said array, said second but not said first ONE inhibit drive field inhibiting the driving of the magnetization of a concurrently affected ONE core into said third time-limited stable state;

ZERO inhibit drive means for alternatively selectively coupling a second polarity first or second different-duration amplitude-limited ZERO inhibit drive field to all the ZERO cores of said array, said second but not said first ZERO inhibit drive field inhibiting the driving of the magnetization of a concurrently affected ZERO core into said third time-limited stable-state;

reset drive means for selectively coupling a second polarity amplitude-limited reset drive field to all the cores of said array for driving the magnetization of said cores back into said second amplitude-limited stable-state from said third time-limited stable-state;

the concurrent coupling of said amplitude-limited X and Y drive fields to all the cores of their selected row and column, respectively, and said reset drive field to all the cores of the array driving the magnetization of the concurrently affected ONE core or said ZERO core into said first amplitude-limited stable-state from said second amplitude-limited stable-state;

sense means coupled to all the cores of said array for intercepting the flux changes due to said driving of the magnetization of said concurrently affected ONE core or ZERO core into said first amplitude-limited stable-state from said second amplitude-limited stable-state and for interpreting said flux changes as indicating whether the magnetization of said ONE core or said ZERO core had previously been set into said third time-limited stable-state.

References Cited

UNITED STATES PATENTS

| | | | |
|---|---|---|---|
| 3,331,064 | 7/1967 | Hewitt | 340—174 |
| 3,271,749 | 9/1966 | Vogl et al. | 340—174 |
| 3,037,197 | 5/1962 | Lockhart | 340—174 |
| 3,359,546 | 12/1967 | James | 340—174 |

BERNARD KONICK, *Primary Examiner.*

P. SPERBER, *Assistant Examiner.*

UNITED STATES PATENT OFFICE

CERTIFICATE OF CORRECTION

Patent No. 3,432,820 March 11, 1969

Fred G. Hewitt

It is certified that error appears in the above identified patent and that said Letters Patent are hereby corrected as shown below:

Column 13, line 37, before "a" insert -- bias drive means for selectivel coupling to said cores --. Column 16, line 32, "coupling" should read -- coupled --; line 36, "indicated" should read -- indicating --; line 37, after "ZERO" insert -- core --; line 74, "filed" should read -- field --. Column 17, line 25, "of" should read -- or --. Column 18, line 40, "limted" should read -- limited --.

Signed and sealed this 31st day of March 1970.

(SEAL)
Attest:

Edward M. Fletcher, Jr.
Attesting Officer

WILLIAM E. SCHUYLER, JR.
Commissioner of Patents